(12) United States Patent
Melo Faus et al.

(10) Patent No.: US 8,932,774 B2
(45) Date of Patent: Jan. 13, 2015

(54) CATALYST FOR A PROCESS FOR OBTAINING HYDROGEN THROUGH REFORMING HYDROCARBONS WITH STEAM, PROCESS FOR PREPARING THE CATALYST AND USE THEREOF IN THE PROCESS

(75) Inventors: Francisco Vicente Melo Faus, Seville (ES); Natalia Morlanes Sánchez, Seville (ES); Isidoro Morales Osorio, Seville (ES); Belén Sarmiento Marrón, Seville (ES); Marianela Martín Betancourt, Seville (ES)

(73) Assignee: Abengoa Hidrogeno, S.A., Seville (ES)

( * ) Notice: Subject to any disclaimer, the term of this patent is extended or adjusted under 35 U.S.C. 154(b) by 51 days.

(21) Appl. No.: 13/181,633

(22) Filed: Jul. 13, 2011

(65) Prior Publication Data

US 2012/0015266 A1 Jan. 19, 2012

Related U.S. Application Data

(63) Continuation of application No. PCT/ES2009/070537, filed on Nov. 27, 2009.

(30) Foreign Application Priority Data

Jan. 13, 2009 (ES) .................................. 200900082

(51) Int. Cl.
*C01B 3/26* (2006.01)
*H01M 8/06* (2006.01)
(Continued)

(52) U.S. Cl.
CPC . *C01B 3/40* (2013.01); *B01J 21/10* (2013.01); *B01J 23/83* (2013.01); *B01J 23/84* (2013.01);
(Continued)

(58) Field of Classification Search
CPC ............ H01M 8/0606; H01M 8/0612; H01M 8/0618; H01M 8/0668; B01J 21/10; B01J 23/75; B01J 23/755; B01J 23/83; B01J 23/84; B01J 37/02; B01J 37/035; B01J 37/036; B01J 37/08; C01B 3/40; C10K 3/04

USPC .................. 429/408, 416, 423, 425; 423/246, 423/650–654; 502/300, 304, 313, 341
See application file for complete search history.

(56) References Cited

U.S. PATENT DOCUMENTS 6,503,866 B1 * 1/2003 Shepherd et al. ............. 502/332
2004/0022710 A1 * 2/2004 Kaliaguine et al. ........... 423/263
(Continued)

FOREIGN PATENT DOCUMENTS

EP 1013603 A1 * 6/2000 ................ C01B 3/40
JP 54139897 A * 10/1979 ............... B01J 23/74
(Continued)

OTHER PUBLICATIONS

International Search Report issued Mar. 10, 2010 in International (PCT) Application No. PCT/ES2009/070537.
(Continued)

*Primary Examiner* — Edu E Enin-Okut
(74) *Attorney, Agent, or Firm* — Wenderoth, Lind & Ponack L.L.P.

(57) ABSTRACT

The present invention relates to a catalyst for producing gaseous hydrogen current or hydrogen-rich currents through hydrocarbon reforming with water vapor. Said catalyst comprises at least one support, an active phase and at least two promoting agents, and is characterized in that it is a metal-type-supported solid in which the active phase comprises at least one transition metal chosen from group VIII, and at least one promoting agent chosen from the alkaline-earth or transition metals; and the support comprises at least one mixed oxide with a basic nature, and at least one promoting agent chosen from among the lanthanides group. The invention also has as an object the process for preparing the catalyst, as well as its use in the process for obtaining the hydrogen or hydrogen-rich gas from hydrocarbons, in different operating conditions and using various types of hydrocarbons. The catalyst to which this invention pertains has elevated activity and selectivity toward the gasification of hydrocarbons, as well as a high resistance to various deactivation mechanisms which the catalyst undergoes during the reforming process with water vapor.

9 Claims, 8 Drawing Sheets

(51) Int. Cl.
 B01J 23/36 (2006.01)
 B01D 53/62 (2006.01)
 B01J 21/10 (2006.01)
 B01J 23/10 (2006.01)
 B01J 23/83 (2006.01)
 C01B 3/40 (2006.01)
 B01J 23/84 (2006.01)
 B01J 29/04 (2006.01)
 B01J 37/03 (2006.01)
 C10K 3/04 (2006.01)

(52) U.S. Cl.
 CPC .............. *B01J 29/049* (2013.01); *B01J 37/035* (2013.01); *B01J 37/036* (2013.01); *C10K 3/04* (2013.01); *C01B 2203/0233* (2013.01); *C01B 2203/044* (2013.01); *C01B 2203/047* (2013.01); *C01B 2203/066* (2013.01); *C01B 2203/1047* (2013.01); *C01B 2203/1052* (2013.01); *C01B 2203/1058* (2013.01); *C01B 2203/1082* (2013.01); *C01B 2203/1094* (2013.01); *C01B 2203/1241* (2013.01); *C01B 2203/1247* (2013.01); *Y02E 60/522* (2013.01)
 USPC ........... 429/425; 429/423; 502/341; 502/304; 502/313; 423/654

(56) References Cited

U.S. PATENT DOCUMENTS

2007/0172401 A1* 7/2007 Wanninger et al. ........... 422/190
2008/0261090 A1* 10/2008 Benito Gonzalez et al. ... 429/17
2010/0166647 A1* 7/2010 Osawa et al. ................. 423/651

FOREIGN PATENT DOCUMENTS

| JP | 2003080070 A * | 3/2003 | ............... B01J 23/60 |
| WO | WO 2006032907 A1 * | 3/2006 | ............... B01J 21/04 |
| WO | WO 2006075035 A1 * | 7/2006 | ............... B01J 21/06 |
| WO | 2007/046591 | 4/2007 | |
| WO | WO 2008047676 A1 * | 4/2008 | ............... C01B 3/40 |
| WO | 2008/049266 | 5/2008 | |
| WO | WO 2008049266 A1 * | 5/2008 | ............ B01J 23/755 |

OTHER PUBLICATIONS

Yu, Xinghe, et al., "Hydrogen production from steam reforming of kerosene over Ni-La and Ni-La-K/cordierite catalysts", Fuel, vol. 85, 2006, pp. 1708-1713.

Garcia, Lucia, et al., "Catalytic steam reforming of bio-oils for the production of hydrogen: effects of catalyst composition", Applied Catalysis A: General, vol. 201, 2000, pp. 225-239.

Park, K., et al., "Structural Characteristics of $(NiMgAl)O_x$ Prepared from a Layered Double Hydroxide Precursor and its Application in Direct Internal Reforming Molten Carbonate Fuel Cells", Fuel Cells, vol. 7, No. 3, 2007, pp. 211-217.

Melo, F., et al., "Study of the composition of ternary mixed oxides: Use of these materials on a hydrogen production process", Catalysis Today, vol. 133-135, 2008, pp. 374-382.

Melo, F., et al. "Synthesis, characterization and catalytic behaviour of NiMgAl mixed oxides as catalysts for hydrogen production by naphtha steam reforming", Catalysis Today, vol. 133-135, 2008, pp. 383-393.

Fonseca, Alessandra, et al., "Production of the hydrogen by methane steam reforming over nickel catalysts prepared from hydrotalcite precursors", Journal of Power Sources, vol. 142, 2005, pp. 154-159.

Borowiecki, T., et al., "The influence of promoters on the coking rate of nickel catalysts in the steam reforming of hydrocarbons", Studies in Surface Science and Catalysis, vol. 119, 1998, pp. 711-716.

* cited by examiner

CATALYST FOR A PROCESS FOR OBTAINING HYDROGEN THROUGH REFORMING HYDROCARBONS WITH STEAM, PROCESS FOR PREPARING THE CATALYST AND USE THEREOF IN THE PROCESS

This application is a Continuation of International Application No. PCT/ES2009/070537, filed Nov. 27, 2009.

FIELD OF THE INVENTION

This invention relates to the technical field of catalysts for reforming hydrocarbon with steam for producing hydrogen-rich gaseous streams which can be used in hydrogen production plants, combustion engines and, specially, as fuel in fuel cell systems, and particularly, for the flexible catalysts sector regarding the kind of hydrocarbons used and resistant to deactivation due to coke formation, sintering and sulfur poisoning.

STATE OF THE ART PRIOR TO THE INVENTION

Fuel cells are electrochemical devices which have the property of transforming the energy of a chemical reaction into electrical energy efficiently and cleanly (without contaminants, when hydrogen is used) and can be used in portable units as well as in stationary ones.

Hydrogen and fuel cells have the property of revolutionizing the way in which we produce and use energy. In this sense, the development of hydrogen production technologies, of fuel cells, the infrastructures needed for its use and the education of the public for their acceptance, play an important role when trying to achieve an economy strongly based in hydrogen, i.e., in the use of hydrogen as an energy carrier and of fuel cells as devices for transforming energy.

To resolve the initial needs of a lower production capacity with a minimum capital investment, the short-term research focuses in the production of hydrogen from natural gas and liquid fuels. In the short and mid-term, the production of hydrogen from hydrocarbons seems to be the best option for achieving a gradual transition towards a hydrogen-based economy, since the current infrastructure already in place for storing and distributing of conventional fuels can be used.

The optimum choice of the technology and hydrocarbon more adequate for obtaining hydrogen depends on the final application of the product, which is what determined the requirements of the gas composition and the scale of the operation.

The reforming catalyst of hydrocarbons with steam is one of the technologies most used for obtaining hydrogen, today it is also the cheapest way for large scale hydrogen production, and it is also a technology of which much data is known (regarding the process, reforming, thermodynamics, kinetics, mechanism, catalyst) since it has been carried out at an industrial scale since the 1930s. Other techniques for obtaining hydrogen are partial oxidation and autothermal reforming. From the point of view of its application as an energy source for fuel cells, hydrocarbon reforming with steam is the process which produces the higher concentration of hydrogen in the product (70-80% in the reforming process with vapor versus 40-50% in the processes of partial oxidation and dry autothermal reforming) and lower emissions of $CO_2$ per mole of hydrogen produced (0.20 in the reforming process with vapor versus 0.35 and 0.85 for the autothermal reforming and partial oxidation, respectively). However, due to its endothermic nature, it requires a greater energy intake, so the integration of the hydrocarbon processing with the electrochemical cell operation, is essential to increase the efficiency of the global process.

Taking into consideration aspects such as availability, toxicity and energy density, liquid hydrocarbons (gasoline and diesel) are considered the most adequate for their use as raw materials in the production of hydrogen through vapor reforming. On the other hand, the use of liquid hydrocarbons benefits from the infrastructure already in place for storing and distributing of conventional fuels.

Steam reforming turns a hydrocarbon stream into a gaseous mixture consisting of $H_2$, $CO$, $CO_2$ and $CH_4$. It is a catalytic process, highly endothermic, which takes place over the surface of a supported metal-type catalyst. The main reactions that take place are the following:

$$C_nH_m + nH_2O \rightarrow nCO + (n+\tfrac{1}{2}m)H_2 \quad \Delta H>0 \tag{1}$$

$$CO + 3H_2 \leftrightarrow CH_4 + H_2O \quad \Delta H=-206 \text{ kJ/mol} \tag{2}$$

$$CO + H_2O \leftrightarrow CO_2 + H_2 \quad \Delta H=41.2 \text{ kJ/mol} \tag{3}$$

In the practice this operation is done to complete conversion of the hydrocarbon, and the composition of the product of the reaction depends on the operating conditions at which the process takes place (pressure, temperature, water/carbon ratio and space velocity), and also on the catalyst used. Thus, for obtaining a hydrogen-rich gas current it's advisable to work under low pressure, high temperature and with a high water/carbon ratio, preferably greater than 3, so as to displace at maximum the thermodynamic balances which determine the gas composition towards the formation of hydrogen.

The steam reforming process usually takes place over the surface of a solid catalyst which comprises at least one metal from the VIII group of the periodic table where nickel is usually the preferred one since it has a better activity/cost ratio. The metal is usually supported over a material which confers it with enough mechanical and thermal resistance for the process, normally $\alpha$-$Al_2O_3$ refractory oxides, aluminosilicates and also basic supports (MgO). Additives are introduced into these catalysts, which prevent coke formation, where the addition of alkalis ($KO_2$) and the use of magnesia are common for this purpose.

The extreme operating conditions at which the hydrocarbon reforming process takes place make it possible to produce, besides coke formation, other mechanisms of catalyst deactivation such as sintering, oxidation of the metallic nickel, its own reaction with the support forming compounds which are difficult to reduce (e.g. $NiAl_2O_4$) and poisoning due to the presence of sulfur compounds present in the hydrocarbon to be processed. These deactivation mechanisms will also depend on the characteristics of the catalyst.

Due to these drawbacks, so that the catalyst can be used in the operation for reforming of hydrocarbons with steam for obtaining hydrogen, it must possess mechanical resistance, thermal stability, resistance to coke formation and to other deactivation mechanisms, besides elevated catalytic activity and selectivity to gasification of the hydrocarbon.

DESCRIPTION OF THE INVENTION

The object of the present invention is a catalyst applicable to a process for obtaining hydrogen or those rich in hydrogen gas through hydrocarbon reforming with steam. Another object of the invention is the process for preparing said catalyst, as well as its use in the process herein described in different operating conditions and using various hydrocarbons. With these objects we intend to overcome the aforementioned drawbacks of the state of the art.

According to the invention, the catalyst comprises a support, an active phase and at least two promoting agents, and is characterized in that the catalyst is a solid of the metal-supported type in which the active phase comprises at least one transition metal selected from group VIII, such as nickel, cobalt, iron, rhodium, palladium, ruthenium and/or platinum, preferably nickel, and at least one promoting agent from among the alkaline earth or transition metals, such as copper, cobalt, manganese, palladium, ruthenium, rhenium, calcium and/or zinc, preferably cobalt, rhenium or combinations of them; and the support comprising at least one mixed oxide having a basic character, preferably a mixed oxide of magnesium and aluminum, and at least one promoting agent selected from the corresponding oxides of the elements that make up the lanthanides, preferably cerium oxide.

The catalyst developed is of metal-supported-type based preferably on nickel, and, particularly, can be obtained through preparing mixed oxides from the thermal decomposing of materials with hydrotalcite-type structure (which can be prepared through the coprecipitation method), and a later activation layer, finally resulting in a material characterized by having small crystals highly dispersed within a matrix with an elevated superficial area. Depending on the variables of the synthesis of the precursor hydrotalcite-type material and the method of preparation, the degree of interaction between the metal and the support can be modified to obtain an adequate dispersion of the nickel, obtaining mid-size particles from 3 to 10 nm over a matrix with a superficial area (BET) from 200 to 300 m²/g.

According to the invention, the catalyst comprises an active phase highly dispersed over a support which confers it with enough mechanical resistance (maintaining its structure in conditions of space velocity, temperature and partial pressure of elevated steam); besides the support participates actively in the superficial reaction that takes place during the process, in the sense that it participates in the activation of the water (adsorption-dissociation and mobility of the oxygen species to the active centers over which the carbon species are found). In its formulation, the catalyst contains various promoting agents, from the active phase as well as from the support, which improve the activity as well as the selectivity, as well as the resistance to the various deactivation mechanisms that take place in the steam reforming processes.

In a preferred embodiment of the invention, the catalyst has an X-ray pattern which contains at least the peaks (degrees) and relative intensities ($I/I_0$):

| 2Θ (degrees) ± 0.5 | Relative Intensity ($I/I_0$) |
|---|---|
| 37.74 | M |
| 43.70 | F |
| 44.58 | MF |
| 51.84 | M |
| 62.78 | M | where
$I_0$ is the intensity of the strongest peak to which a value of 100 has been assigned;
d is a weak relative intensity of 0 at 20%;
m is a medium relative intensity of 20% to 40%
f is a strong relative intensity of 40% to 60%;
mf is a very strong relative intensity of 60% to 100%.

The indicated values correspond to a characterization of the catalyst through X-ray diffraction in which the measurements are made in a Philips PW 1830 diffractometer (PW 1710 controller) using Cu Kα radiation (radiation power 30 mA 40 kV) and for the identification of phases a scanning program is used, which measures 0.5° per step from 3.5° to 70° of 2Θ and the measurement time per phase is of 0.25 seconds. The other X-ray patterns, as well as the X-ray diffractograms referred to in this specifications and in its claims, have been obtained in the same basic conditions.

In an even more preferred embodiment, the catalyst has an X-ray pattern which contains at least the peaks (degrees) and relative intensities ($I/I_0$):

| 2Θ (degrees) ± 0.5 | Relative Intensity ($I/I_0$) |
|---|---|
| 37.74 | M |
| 43.70 | M |
| 44.58 | MF |
| 51.84 | D |
| 62.78 | M | where
$I_0$ is the intensity of the strongest peak to which a value of 100 has been assigned;
d is a weak relative intensity of 0 at 20%;
m is a medium relative intensity of 20% to 40%;
f is a strong relative intensity of 40% to 60%;
mf is a very strong relative intensity of 60% to 100%.

According to a preferred embodiment, the catalyst described comprises from 1% to 15% in weight of the active phase and from 1% to 20% in weight of each of the promoting agents (from the active phase and the support). More preferably, the catalyst comprises from 3% to 10% in weight of the active phase, and from 5% to 15% in weight of each one of said promoting agents.

According to a preferred embodiment, the layered precursor of the support can have a hydrotalcite-type structure and comprises divalent cations [M(II)] and trivalent cations [M(III)] in a molar ratio of [M(III)/M(II)+M(III))]=0.2-0.33. In a more preferred embodiment the support comprises a mixed oxide with a molar ratio of [M(III)/M(II)+M(III))]=0.2-0.33, where [M(II)] is preferably magnesium and [M(III)] is preferably aluminum, containing the molar proportion Al/(Al+Mg) in the interval from 0.20 to 0.33, the nickel content can be from 1 to 15% in weight, the cobalt content can be from 1 to 20% in weight, and the cerium oxide content can be from 1 to 20% in weight.

According to another even more preferred embodiment the mixed magnesium and aluminum oxide contains a molar proportion Al/(Al+Mg) equal to 0.25, the nickel content can be from 3 to 10% in weight, the cobalt content can be from 5 to 15% in weight, and the cerium oxide content can be from 5% to 15% in weight.

According to another even more preferred embodiment, the nickel content can be from 5% to 7% in weight, the cobalt content can be from 6% to 9% in weight, and the cerium oxide content can be from 7% to 10% in weight.

According to a particular embodiment the active phase can contain besides cobalt, another promoting agent of the active phase which can be rhenium. The rhenium content can preferably be from 0.1 to 2% in weight.

The present invention also relates to the process for preparing the catalyst with the aforementioned characteristics. This process comprises the following stages:

a first stage, of synthesis, in which a precursor of the catalyst is prepared which is a double layered hydroxide with hydrotalcite-type structure which contains all the constituent elements of the catalyst;

a second stage, of thermal decomposing, in which a mixed oxide is formed from the calcination of the layered precursor prepared in the first stage, a third stage, of activation, in which the metal-supported-type catalyst is obtained through a reduction treatment of the mixed oxide formed in the second stage.

In the synthesis stage a hydrotalcite-type precursor can be prepared, e.g., through coprecipitation of all the constituent elements. The molar ratio between them, in order to favor the formation of the typical layered structure of the hydrotalcite is: [M(III)/(M(II)+M(III))]=0.2-0.33. Which means that the ratio between the trivalent cations with regards to the total cations (sum of the tri and divalent cations) is comprised in the range from 0.2 to 0.33.

The thermal decomposing stage implies obtaining a mixed oxide from the calcination of the precursor synthesized in the first stage. The mixed oxide can be generated with a calcination treatment in an air atmosphere up to a temperature from 723 to 1273 K, preferably from 923 to 973 K.

The activation stage for the formation of the final catalyst from the generated mixed oxide in the second stage implies an activation treatment. The activation of the mixed oxide to generate the metal-type-supported catalyst, can consist in a reduction treatment up to a temperature from 873 to 1173 K, preferably from 973 to 1023 K.

In the events in which a second promoting agent of the active phase is introduced, the process further comprises an impregnation stage of the rhenium which takes place between the thermal decomposing and activation stages.

According to a preferred embodiment, the synthesis of the layered precursor can include the following steps: Preparation of two solutions (one solution contains the metals of interest and the other one contains their precipitating base), coaddition of them for obtaining a gel, aging of the gel for the crystallization of the hydrotalcite phase, washing of the gel to a neutral pH and drying of the neutral gel; the thermal decomposing stage can consist in this case of a calcination process in an air atmosphere at a temperature from 723 to 1273K, while the activation stage can consist of a reduction treatment in a hydrogen atmosphere up to a temperature from 873 to 1173K.

According to the particular embodiment, the synthesis of the layered precursor with hydrotalcite-type structure contains all the constituent elements of the catalyst, and the divalent and trivalent cations keep the molar ratio: M(III)/(M(II)+M(III))]=0.2-0.33. More preferably, the molar ratio is of 0.25. in this case, the thermal decomposing stage can consist in a calcinations process in an air atmosphere at a temperature up to from 723K to 1273K and the activation stage can consist in a reduction treatment in a hydrogen atmosphere at a temperature up to from 873 to 1173K. According to this particular embodiment the rhenium impregnation (prior to the activation stage) is preferably carried out at pore volume, via alcoholic solution.

Preferably, the molar proportion between the divalent and trivalent cations of the layered precursor with hydrotalcite structure [M(III)/(M(II)+M(III))] is equal to 0.25, the calcinations stage in an air atmosphere is carried out at a temperature from 773 to 1173K and the reduction stage in hydrogen atmosphere is carried out at a temperature from 873 to 1073K. According to this preferred embodiment the rhenium impregnation (prior to the activation stage) is preferably done at pore volume, via alcoholic solution.

According to a preferred embodiment of the invention, the layered precursor with hydrotalcite-type structure can have an X-ray pattern which contains at least the peaks (degrees) and relative intensities ($I/I_0$):

| 2Θ (degrees) ± 0.5 | Relative Intensity ($I/I_0$) |
| --- | --- |
| 11.94 | MF |
| 23.68 | MF |
| 34.96 | F |
| 39.16 | M |
| 46.41 | M |
| 60.97 | F |
| 62.23 | F | where
$I_0$ is the intensity of the strongest peak to which a value of 100 has been assigned;
d is a weak relative intensity of 0 to 20%;
m is a medium relative intensity of 20% to 40%;
f is a strong relative intensity of 40% to 60%;
mf is a very strong relative intensity of 60% to 100%.

According to this preferred embodiment, the calcination stage in an air atmosphere is carried out at a temperature of from 873 to 973K, the mixed oxide can have an X-ray pattern which contains at least the peaks (degrees) and relative intensities ($I/I_0$):

| 2Θ (degrees) ± 0.5 | Relative Intensity ($I/I_0$) |
| --- | --- |
| 37.72 | M |
| 43.75 | MF |
| 63.15 | F | where
$I_0$ is the intensity of the strongest peak to which a value of 100 has been assigned;
d is a weak relative intensity of 0 to 20%;
m is a medium relative intensity of 20% to 40%;
f is a strong relative intensity of 40% to 60%;
mf is a very strong relative intensity of 60% to 100%.

Likewise, when according to this preferred embodiment the reduction stage in a hydrogen atmosphere is carried out at a temperature from 973 to 1073 K, a catalyst is obtained which can have an X-ray pattern which contains at least the peaks (degrees) and relative intensities ($I/I_0$):

| 2Θ (degrees) ± 0.5 | Relative Intensity ($I/I_0$) |
| --- | --- |
| 37.74 | M |
| 43.70 | M |
| 44.58 | MF |
| 51.84 | D |
| 62.78 | M | where
$I_0$ is the intensity of the strongest peak to which a value of 100 has been assigned;
d is a weak relative intensity of 0 to 20%;
m is a medium relative intensity of 20% to 40%;
f is a strong relative intensity of 40% to 60%;
mf is a very strong relative intensity of 60% to 100%.

According to the invention, the catalyst can comprise from 1 to 15% in weight, preferably from 3 to 10% in weight, of the active phase as well as from 1 to 20% in weight, preferably from 5 to 15% in weight of the promoting agent. When the active phase comprises nickel and a second promoting agent is cerium, the catalyst preferably comprises from 5 to 7% in weight of nickel and from 7 to 10% in weight of cerium oxide.

The catalyst according to this invention, used in catalytic processes of hydrocarbon reforming with steam, has a high catalytic activity, with basically a total conversion of the hydrocarbon fed, high selectivity for the production of hydrogen, and high stability without deactivation due to coke formation at low water/carbon ratio conditions. These catalytic characteristics are adequate for their use in this type of processes, and can be obtained, e.g., taking advantage of the physical-chemical and textural properties arising from the layered structure of hydrotalcite-type precursor. These precursors allow a rational design of multi-functional nano-structured catalysts, highly functionalized at atomic level, with homogenous inter-dispersion between the constituent elements, characterized in that they have small highly dispersed crystals within the matrix with basic nature and elevated superficial area; the catalyst preparation process allows to control the nature of the active centers as well as that of their environment. Depending on the composition, the precipitation method and the various thermal treatments to with the solid is subjected during the synthesis stages, a degree of metal-support interaction is established which is what allows to control the characteristics of the active centers as well as those of its environment.

The present invention also relates to the use of the catalyst with the previously indicated characteristics which can be prepared according to the described process, in a method for obtaining hydrogen or a hydrogen-rich gas from various hydrocarbons.

The method implies the hydrocarbons reforming reaction with steam in the presence of the catalyst developed and in determined operating conditions.

In a preferred manner, the hydrogen or the hydrogen-rich gas obtained from the hydrocarbons is adequate for its use in fuel cells.

The obtaining method is preferably a catalytic process for reforming an hydrogen carrier selected from a group of fossil fuels consisting of natural gas, naphtha, diesel, or also vegetable oils, which comprises reacting the hydrogen carrier with water in the presence of the catalyst, at a temperature from 673 to 1073 K to obtain a mixture of gases which contain hydrogen. Water and the hydrogen carrier are reacted at a pressure of from 0 to 5 bar, preferably from 0 to 3 bar, and more preferably at atmospheric pressure.

According to a preferred embodiment, water and the hydrogen carrier are reacted at a mole ratio of water/carbon mole of the hydrogen carrier from 5:1 to 1:1, preferably from 4:1 to 2:1.

In a preferred embodiment, water and the hydrogen carrier are reacted at a temperature from 773 to 1023 K, preferably from 923 to 973 K.

The water that can be reacted with the hydrogen carrier is present preferably in the form of steam.

According to another preferred embodiment, the mixture of gases which comprises the hydrogen, resulting from the reaction of the hydrogen carrier with the water, is fed into a medium or high temperature fuel cell.

According to a subsequent preferred embodiment, the mixture of gases which comprises the hydrogen, resulting from the reaction of the hydrogen carrier with water, is subjected to a purifying stage to turn at least part of the carbon monoxide eventually present in the mixture of gases into carbon dioxide to obtain a purified mixture of gases, and because said purified mixture of gases is fed to a fuel cell. According to this embodiment the fuel cell can be selected from medium and low temperature fuel cells.

When the catalyst used in the catalytic hydrocarbon reforming process with water vapor, carried out in fixed-bed continuous flow tubular reactor, in the following operating conditions: water/carbon ratio from 1 to 4 moles of water for every gram atom of carbon, temperature from 773 to 1073 K, pressure comprised from 0 to 3 bar above atmospheric pressure and space velocities of the gas from 50000 to 200000 $h^{-1}$, a total conversion of the hydrocarbon is produced, and a hydrogen-rich gaseous stream is obtained, from 65 to 70% in volume, obtaining carbon monoxide and carbon dioxide and methane (from 3 to 1% vol.) as by-product. In long duration tests in the most severe operating conditions, the activity is maintained without observing signs of deactivation. The preferred operating conditions for the use of the catalyst developed in this invention, in the process or hydrocarbon reforming with water vapor, are the following: water/carbon ration from 3 to 3.5 moles of water per every gram atom of carbon, temperature of the reaction from 923 to 973 K, work pressure between 0 and 1 bar above atmospheric pressure and space velocity of the gas from 70000 to 150000 $h^{-1}$.

In an embodiment of this use according to the invention, the mixture of gases which comprises the hydrogen, resulting from the reaction of the hydrogen carrier with the water, is fed into a high temperature fuel cell. In this case, this mixture which contains the hydrogen produced can be directly fed to the anode of a high temperature fuel cell, such as for example, molten carbonate fuel cells—MCFC—or solid oxide fuel cells—SOFC, IT-SOFC—without having to purify it. This is because the $CO_2$ would behave as inert and the rest of the components present in the mixture of gases, such as CO and $CH_4$ would act as fuel in this type of cells, where due to the reaction with oxygen of the air fed in the cathode, electrical energy would be generated.

In another embodiment of the use according to the invention, the mixture of gases which comprises the hydrogen resulting from reacting the hydrogen carrier with water, is subjected to a purifying stage to convert at least part of the carbon monoxide eventually present in the purified mixture of gases, and because said mixture is fed to a fuel cell. This embodiment is specially adequate for the case of medium temperature fuel cells, such as for example, phosphoric acid fuel cells—PAFC—or low temperature fuel cells, such as for example, polymer fuel cells—PEMFC—, in which it is necessary to introduce various stages of purification to reduce the carbon monoxide concentration to the required levels for the proper functioning of said fuel cells (1% vol. and 50 ppm, respectively). To carry out this purification, a reaction called "water-gas shift" (water gas shift, WGS), in which the carbon monoxide reacts with water to produce hydrogen and carbon dioxide. The advantage of this reaction is double, since, besides eliminating the CO present in the reforming current, the hydrogen content is increased. Generally, the residual CO that is usually left after the WGS stage is usually higher than that which can be fed to a low temperature polymer-type fuel cell. To reduce this concentration of residual CO there are several alternatives among which is worth mentioning the PSA systems (Pressure Swing Absorption), methanation and selective carbon monoxide oxidation. The water generated in the fuel cell could be re-circulated to the hydrogen production process, minimizing its consumption in the global scheme of the process.

It can be observed that this invention not only allows obtaining hydrogen from various hydrocarbons with an inexpensive, lasting and stable catalyst, but also the stationary and mobile production of said hydrogen, with a hydrogen production yield close to the thermodynamic one regarding the conditions used. Besides the mixture of gases generated can be used to directly feed the medium and high temperature fuel cells.

BRIEF DESCRIPTION OF THE DRAWINGS

Below the aspects of the invention will be described on the basis of some examples in which we will refer to some drawings which make up an integral part of this specification, in which:

FIG. 10 shows the distribution of the products obtained in the catalytic test referred to in FIG. 9, FIGS. 11-15 show the conversion results of various hydrocarbons (natural gas, naphtha, diesel and sunflower oil) in the reforming with steam reaction as depending on the reaction's temperature in the presence of catalysts NiMgAl, NiMgCoAlCe, 1ReNiMgCoAlCe

EXAMPLES

Example 1

Preparation of the NiMgCoAlCe Catalyst

Below are described the stages for preparing a catalyst with composition NiMgCoAlCe.

The catalyst prepared was characterized through X-ray diffraction after each one of the stages that include the synthesis. The measurements were made in a Philips PW 1830 diffractometer (PW 1710 controller) using Cu $K_\alpha$ radiation (power of the radiation 30 mA 40 kV). For the identification stages a scanning program was used which measures 0.5° per step from 3.5° to 70° of $2\theta$ and uses a measurement time per step of 0.25 seconds.

$1^{st}$ Stage: Synthesis of the Layered Precursor with Hydrotalcite-Type Structure HT-NiMgCoAlCe: A Layered Precursor has been Synthesized with the Following Values:

$[(Al^{3+}+Ce^{3+})/(Ni^{2+}+Mg^{2+}+Al^{3+})]$ ratio equal to 0.25,
nickel percentage in the mixed oxide at a 5% in weight,
Al/Ce ratio equal to 10 and Mg/Co ration equal to 20.

For the synthesis of this material two aqueous solutions were prepared; one acidic and another one basic. The acidic solution contained nitrates, nickel, cobalt aluminum and cerium with a total concentration $(Ni^{2+}+Mg^{2+}+Co^{2+}+Al^{3+}+Ce^{3+})$ equal to 1.5 M, while the basic solution was obtained mixing the proper quantities of NaOH and $Na_2CO_3$ which allowed to maintain a $[CO_3^{2-}/(Ni^{2+}+Mg^{2+}+Co^{2+}+Al^{3+}+Ce^{3+})]$ ratio equal to 0.66 and pH of the gel from the synthesis at 13. The solutions were added simultaneously at a speed of 30 ml/h, at ambient temperature, at atmospheric pressure and with vigorous mechanical agitation during 4 hours. The gel obtained was aged in propylene jars at 333 k during 12 hours. After the aging the solid was filtered and washed with distilled water until the pH in the waters used to wash it was neutral (pH=7). Finally, it was dried at 333 K during 12 hours.

Figure 1:
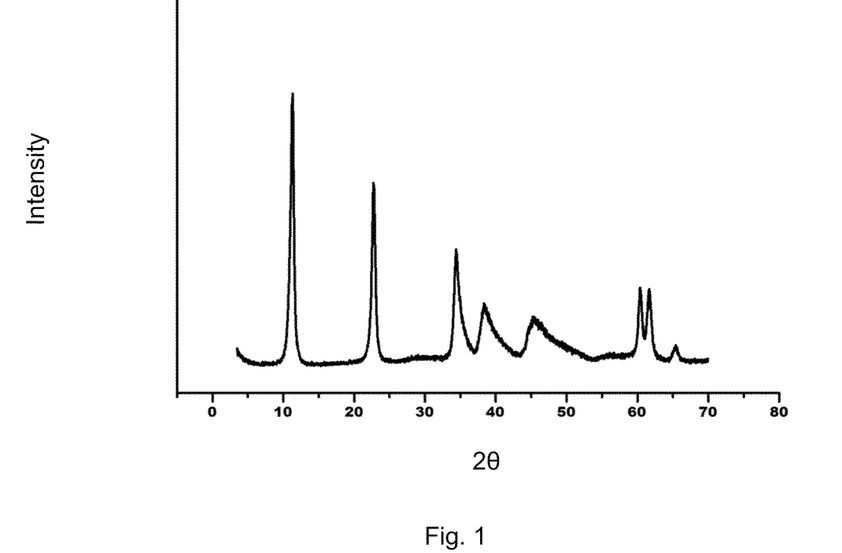
FIG. 1 shows an X-ray diffraction diagram corresponding to a layered precursor with hydrotalcite-type structure, synthesized for preparing a catalyst according to this invention.

The solid obtained was characterized through X-ray diffraction resulting in the diagram shown in FIG. 1, in which the signs of diffraction corresponding to a double-layered hydroxide with hydrotalcite-type structure.

$2^{nd}$ Stage: Formation of the Corresponding Mixed Oxide

Figure 2:
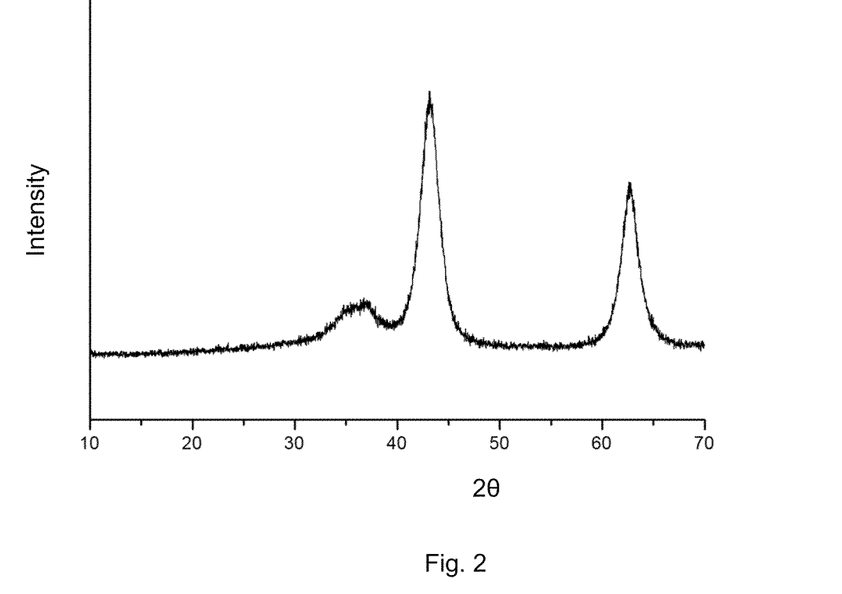
FIG. 2 shows an X-ray diffraction diagram corresponding to a mixed oxide resulting from the thermal decomposing of the layered precursor characterized in FIG. 1, FIG. 3 show an X-ray diffraction diagram corresponding to the metal-type-supported catalyst obtained from the mixed oxide characterized in FIG. 2.

The layered precursor prepared in stage 1 was calcined in an air atmosphere up to 923 K during 6 hours and a mixed Ni—Mg—Co—Al—Ce oxide was obtained. In FIG. 2 it can be visualized the X-ray diffraction diagram corresponding to the resulting mixed oxide of the thermal decomposing of the layered precursor.

$3^{rd}$ Stage: Obtaining the Metal-Supported-Type Catalyst

Figure 3:
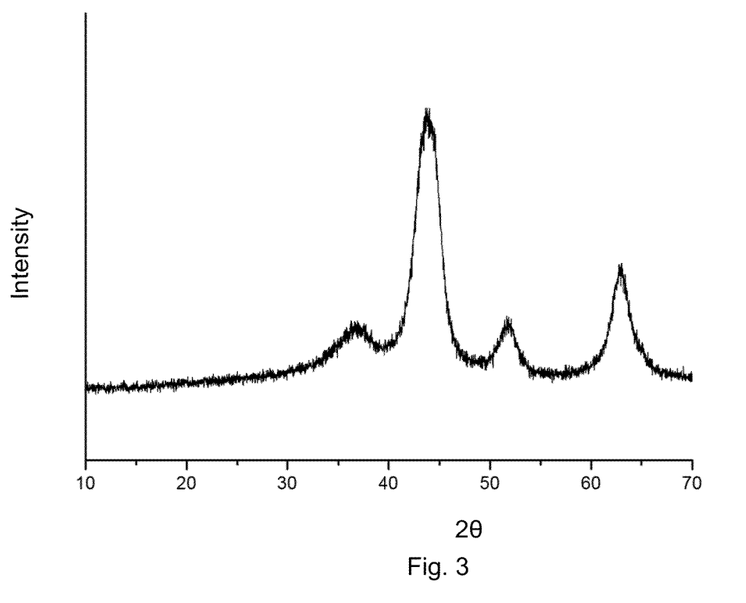

The mixed oxide from stage 2 was activated in a hydrogen reducing atmosphere up to 973 K during 2 hours and a supported-metal-type solid $(NiCo/MgAlCeO_x)$ was obtained which could be used as a catalyst in the hydrocarbon reforming with water vapor processes. In FIG. 3 we can visualize the X-ray diffraction diagram corresponding to the mixed oxide resulting from the thermal decomposing of the layered precursor.

Example 2

Use of the Catalyst Prepared According to Example 1, in the Reforming with Water Vapor Process of Various Hydrocarbons The reactor used in the catalytic tests was built with refracting steel AISI 310, to withstand the elevated operating temperatures; its dimensions were 400/9.7/2 (length/external diameter/wall, in mm) and was housed inside a heated section formed by 4 independent heating areas (600 W) which covered the length of the catalytic bed. The temperature control of the four areas was done using four thermocouples housed inside a pod located along the long axis of the reactor. The catalytic bed consisted of the catalyst mixed with a determined quantity of silicon carbide which acted as an inert diluting agent (catalyst/diluting agent=1/14, in weight).

The reforming with steam of a natural gas, naphtha or diesel was studied. As a representative compound of natural gas we chose methane $(CH_4)$. As a representative fraction of naphtha a mixture of heptane and hexane (70% n-heptane, 30% n-hexane, percentage in weight) was chosen of average molecular formula $C_{6.7}H_{15.3}$. as a representative fraction of diesel a mixture of butylbenzene, 1-octene and dodecane, tetradecane, hexadecane was chosen, representing the aromatic fractions, olefins and paraffins present in diesel (12% butylbenzene, 5% 1-octene, 83% (dodecane+tetradecane+hexadecane), percentage in weight); the average molecular formula of this mixture was $C_{14}H_{29}$.

The loads listed above fall into the group of fossil fuels, because of it, we also chose sunflower oil representing a renewable raw material. The sunflower oil (Carrefour brand) was characterized through elemental analysis to determine its composition, corresponding to the following molecular: $O_{57}H_{99}O_6$.

In the tests carried out with different feeds, the mass of the catalyst (500 mg, with a particle size comprised from the mesh sizes of 0.25 to 0.42 mm), total space velocity of the gas (127000 L·kg$^{-1}$·h$^{-1}$), water/carbon ratio (3 mole $H_2O$/mol C) and the number of gram atoms of Carbon in the reacting mixture, were kept constant. The molar flow of methane was 6.7 times greater than that of the naphtha, that of diesel was 6.7/14 times that of naphtha, and that of sunflower oil was 6.7/57 times that of naphtha. This way, the partial pressures of each one of the hydrocarbons were different, and so was the contact time with regards to the mass of the catalyst. In the following table we can observe the values of these variables:

TABLE 1

Partial pressure of the various hydrocarbons studied, and contact times

| Hydrocarbon | $P_{hydrocarbon}$ (kPa) | W/F (g h/mol hydrocarbon) |
|---|---|---|
| Methane | 24 | 0.7 |
| Naphtha | 3.58 | 4.7 |
| Diesel | 1.71 | 9.5 |
| Sunflower oil | 0.42 | 40.4 |

Figure 4:
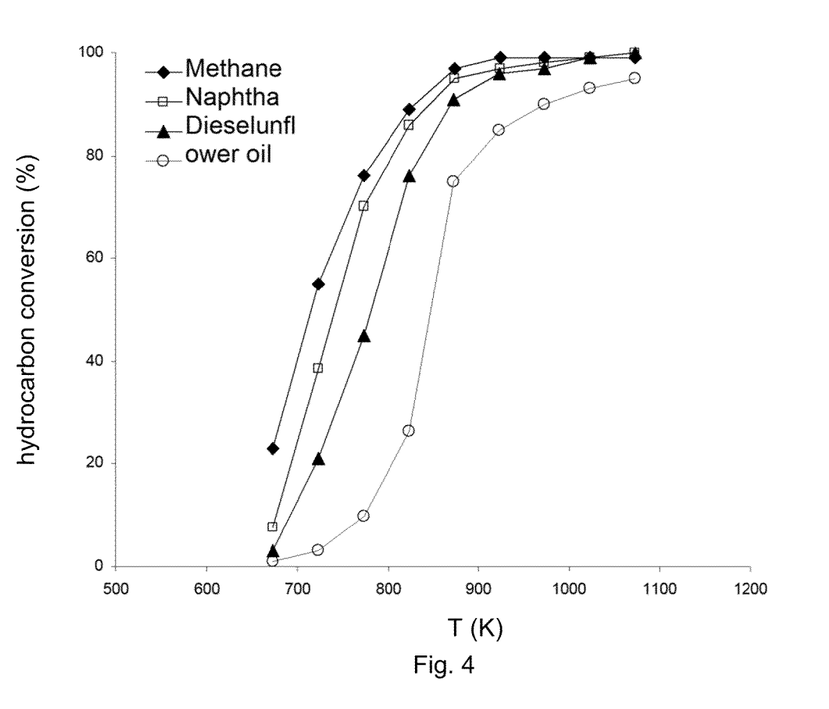
FIG. 4 shows the conversion results of various hydrocarbons in the reforming with steam reaction depending on the reaction's temperature, carried out in the presence of the catalyst characterized in FIG. 3, where the hydrocarbons studied are a stream of natural gas, naphtha, diesel and sunflower oil.

FIG. 4 shows the activity of the catalyst depending on the reaction temperature for the various hydrocarbons studied (Operating conditions: P=1 atm, T=673-1073 K, S/C=3.3 mol $H_2O$/gm-atom C and GHSV=225160 Lkg$^{-1}$ h$^{-1}$). It can be observed how in these conditions the three hydrocarbons reached total conversion. It shows the possibility of using materials obtained from HDL thermal decomposing for the reforming with water vapor reaction of various hydrocarbons, such as natural gas, diesel and sunflower oil.

Example 3

Stability of the Catalyst in the Naphtha Reforming with Steam Process in Severe Conditions (Stoichiometric Water/Carbon Ratio)

Figure 5:
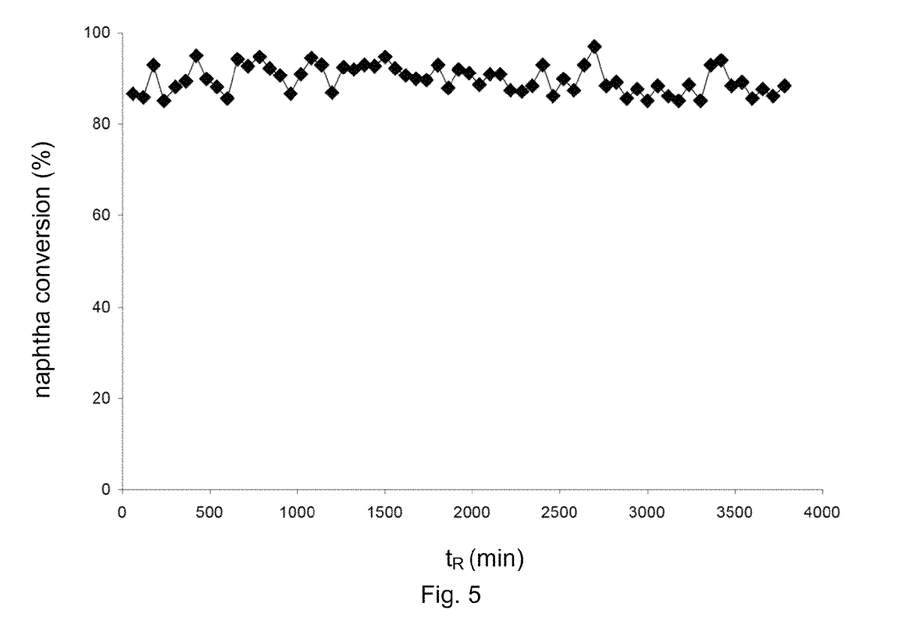
FIG. 5 shows the conversion results of naphtha in the reforming with steam reaction depending on the reaction time, carried out in the presence of the catalyst characterized in FIG. 3, under experimental conditions of high temperature and low water/carbon ratio.
Figure 6:
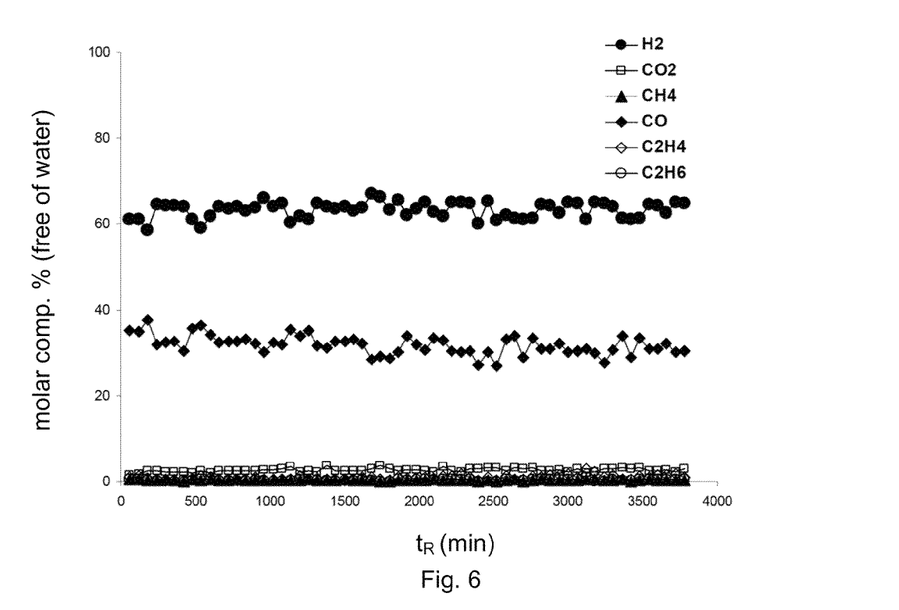
FIG. 6 shows the distribution of the products obtained in the catalytic test referred to in FIG. 5.

To study the resistance of the catalyst developed in example 1, a catalytic test was done to the coke formation in conditions of high temperature (1023 K) and low water/carbon ratio (1 mol $H_2$/mol C). The study was done in the reactor describeddin Example 2. The hydrocarbon fed in this test was the representative fraction of the naphtha. FIG. 5 (Operating conditions: P=1 atm, T=1023 K, S/C=1 mol $H_2O$/gram-atom C, W/F=5 $g_{cat}$ h/mol hydrocarbon, GHSV=137000 L·kg$^{-1}$·h$^{-1}$, $P_{CnHm}$=4 kPa, $P_{H2O}$=27 kPa) shows the conversion of naphtha depending on the reaction time. The distribution of the reaction products in this test can be observed in FIG. 6 (Operating conditions: P=1 atm, T=1023 K, S/C=1 mol $H_2O$/gram-atom C, W/F=5 $g_{cat}$ h/mol hydrocarbon, GHSV=137000 h$^{-1}$, $P_{CnHm}$=4 kPa, $P_{H2O}$=82 kPa).

Example 4

Figure 7:
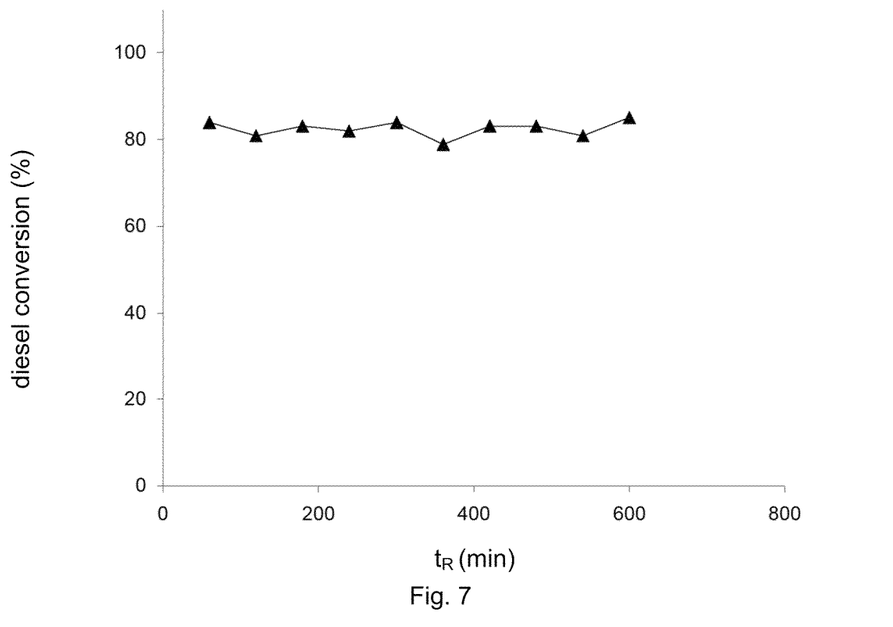
FIG. 7 shows the conversion results of a commercial diesel with 5 ppm of sulfur in a reforming with steam reaction, depending on the reaction time, carried out in the presence of the catalyst characterize in FIG. 3.
Figure 8:
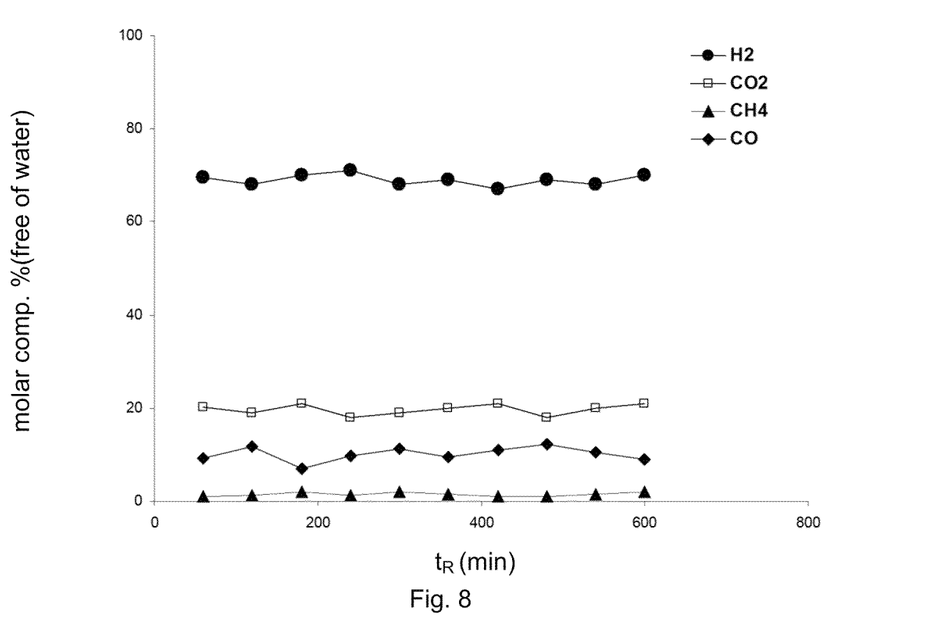
FIG. 8 shows the distribution of the products obtained in the catalytic test referred to in FIG. 7.

Stability of the Catalyst in the Diesel Reforming with Steam Process, when the Diesel Contains Up to 5 PPM of Sulfur This test was carried out to study the resistance of the catalyst developed in example 1, to sulfur poisoning, catalytic test using a commercial diesel with a total sulfur content of 5 ppm, and was done in the reactor described in Example 2. FIG. 7 shows the diesel conversion depending on the reaction time (Operating conditions: P=1 atm, T=923 K, S/C=3 mol $H_2O$/gram-atom C, W/F=15.5 $g_{cat}$ h/mol hydrocarbon, GHSV=70000 L·kg$^{-1}$·h$^{-1}$, $P_{CnHm}$=2.3 kPa, $P_{H2O}$=95.4 kPa). The distribution of the products of the reaction obtained in this test can be observed in FIG. 8 (Operating conditions: P=1 atm, T=923 K, S/C=3 mol $H_2O$/gram-atom C, W/F=15.5 $g_{cat}$ h/mol hydrocarbon, GHSV=70000 L·kg$^{-1}$·h$^{-1}$, $P_{CnHm}$=2.3 kPa, $P_{H2O}$=95.4 kPa).

Stability of the Catalyst in Other Operating Conditions

Figure 9:
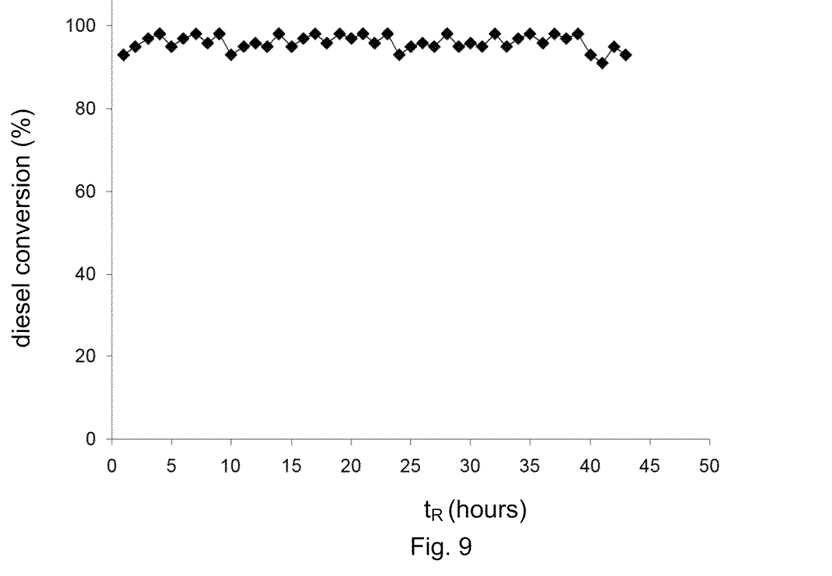
FIG. 9 shows the conversion results of a commercial diesel with 5 ppm of sulfur in a reforming with steam reaction depending on the reaction time, carried out in the presence of the catalyst characterized in FIG. 3.
Figure 10:
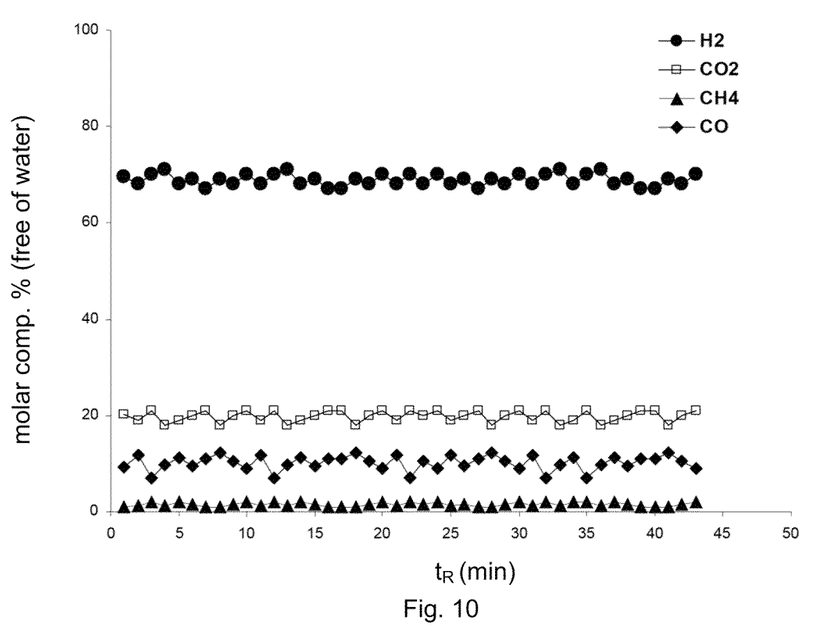

The catalyst developed 5NiMgCoAlCe, was functioning during 43 hours of reaction, with stops at the end of each working day and start ups the next day. The stop consisted in cutting the feed and lowering the temperature to 673 K. the start up consisted in feeding the reacting mixture when the temperature of the bed reached 973 K. Previously, the bed temperature was raised up to 1073 K in the presence of the reducing mixture 10% $H_2$ in $N_2$. The results of the activity at this temperature are shown in FIGS. 9 and 10 (Operating conditions: $Q_{diesel}$=3 ml/min, P=1 atm, T=973 K, S/C=3.3 mol $H_2O$/gm-atom of carbon, W/F=52.4 $g_{cat}$·h/diesel mol, GHSV=21656 Lkg$^{-1}$ h$^{-1}$).

Example 5

Introduction of Rhenium Over the Catalyst Prepared in Example 1, Obtaining of the Catalyst 1ReNiMgCoAlCe This example describes the preparation of a catalyst with composition 1ReNiMgCoAlCe from a NiMgCoAlCe catalyst.

The two first stages of the synthesis described in example 1, (the first one: preparation of the layered precursor with hydrotalcite-type structure and the second one: formation of the corresponding mixed oxide) were the same for this catalyst.

Next, rhenium was introduced into the composition through impregnation after the second stage of calcination. The impregnation was carried out at pore volume dissolving the rhenium precursor in ethanol to avoid the regeneration of the precursor's layered structure.

After the impregnation stage, the catalyst was subjected again to a calcination stage in an air atmosphere up to 873 K during 5 hours to form the rhenium oxide. Finally, it was activated in a reducing atmosphere of hydrogen up to 973 K during 2 hours obtaining a metal-supported-type solid (NiCoRe/MgAlCeOx) which could be used as a catalyst in the hydrocarbon reforming with water vapor processes. The catalyst thus obtained has an X-ray diffraction diagram analogous to that of FIG. 3, since the species of rhenium are not observed when it is introduced at percentages of from 0.2 to 2% in weight.

Example 6

Improvement of the Characteristics of the Catalyst Prepared in Example 5 with Regard to the Catalyst Prepared in Example 1, when a Hydrocarbon Reforming with Water Vapor Reaction is Used The catalyst 1ReNiMgCoAlCe was used in the reforming with water vapor process of various hydrocarbons. The hydrocarbons studied and the design of the experiments has been described in example 2.

FIGS. 11-15 show the conversion results of the various hydrocarbons studied depending on the reaction's temperature. In them it is observed, that for each of the hydrocarbons, the activity of the catalyst NiMgCoAlCe prepared according to example 1, of the catalyst 1ReNiMgCoAlCe prepared according to example 5, and also of the base catalyst NiMgAl. All figures show how the activity of the base catalyst increases when Co and Re are introduced.

Figure 11:
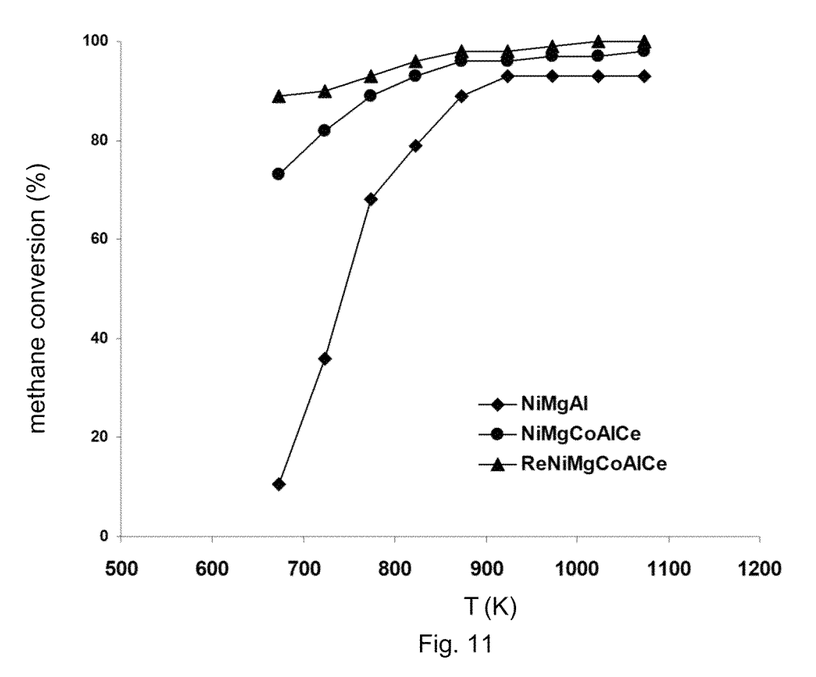

Operating Conditions:

FIG. 11: P=1 atm, T=673-1073 K, S/C=3.3 mol $H_2O$/gram-atom C and GHSV=225160 $Lkg^{-1} h^{-1}$.

Figure 12:
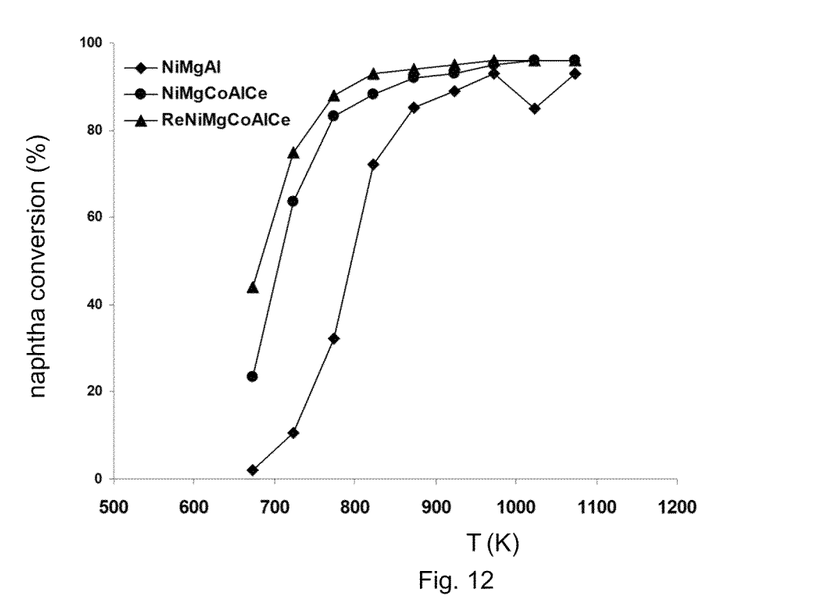

FIG. 12: P=1 atm, T=673-1073 K, S/C=3.3 mol $H_2O$/gram-atom C and GHSV=225160 $Lkg^{-1} h^{-1}$.

Figure 13:
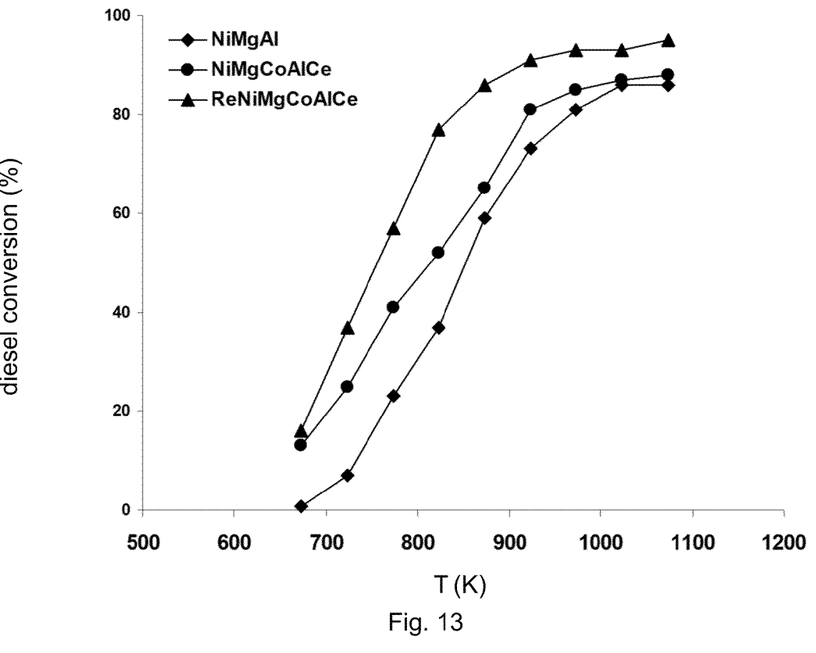

FIG. 13: P=1 atm, T=673-1073 K, S/C=3.3 mol $H_2O$/gram-atom C and GHSV=225160 $Lkg^{-1} h^{-1}$.

Figure 14:
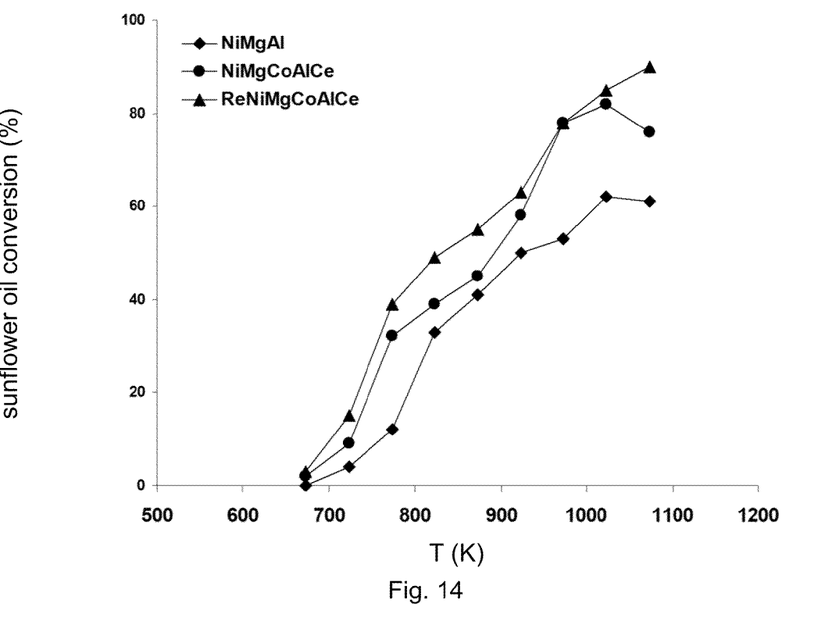

FIG. 14: P=1 atm, T=673-1073 K, S/C=3.3 mol $H_2O$/gram-atom C and GHSV=225160 $Lkg^{-1} h^{-1}$.

Figure 15:
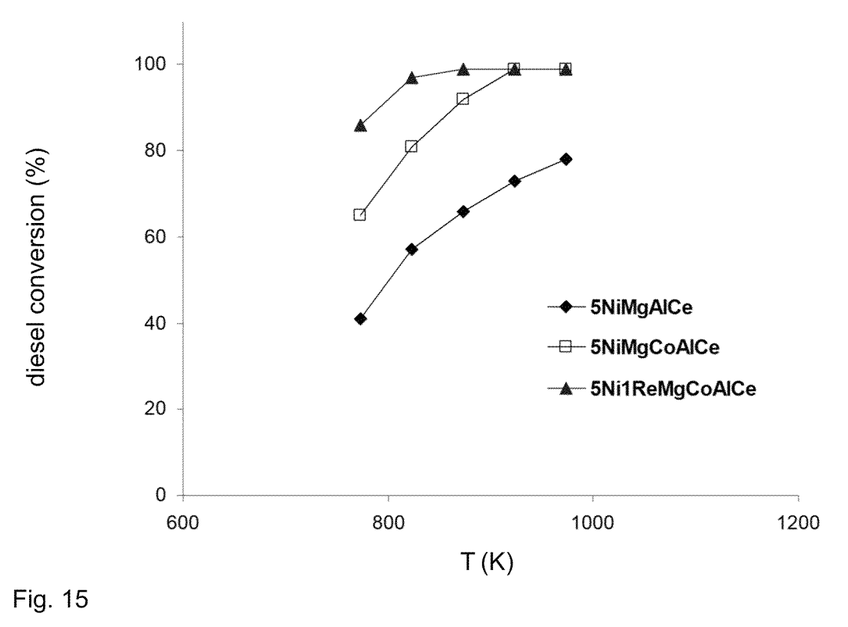

FIG. 15: P=1 atm, T=773-973 K, S/C=3 mol $H_2O$/gram-atom of Carbon, W/F=15.5 $g_{cat}$ h/diesel mol, GHSV=70846 $Lkg^{-1} h^{-1}$.

The invention claimed is:

1. A catalyst for obtaining hydrogen or a hydrogen-rich gas through aliphatic hydrocarbon reforming with steam, comprising:
   a support which comprises
      at least one mixed oxide having a basic character comprising Mg and Al in a molar proportion of Al/(Al+Mg) of 0.25, and
      a promoting agent of the support consisting of cerium oxide in a proportion of 1% to 20% in weight; and
   an active phase, which is 1% to 15% in weight of the catalyst, comprising
      a transition metal consisting of nickel in a proportion of 1% to 15% in weight,
      a first promoting agent consisting of cobalt in a proportion of 1% to 20% in weight, and
      a second promoting agent selected from rhenium,
   wherein said catalyst contains small crystals of 3 to 10 nm highly dispersed within a matrix with an elevated superficial area (BET) from 200 to 300 $m^2/g$, and is obtained by a process comprising:
      preparing a precursor of the catalyst in a synthesis stage, wherein the precursor is a double layered hydroxide with a hydrotalcite-type structure which contains a transition metal consisting of nickel, a promoting agent consisting of cobalt, a promoting agent of the support consisting of cerium oxide, Mg and Al;
      forming a mixed oxide by calcination of the precursor prepared in the synthesis stage in a thermal decomposing stage
      impregnating the mixed oxide obtained in the decomposing stage with rhenium in an impregnation stage before subjecting it to an activation stage; and
      reducing the mixed oxide of the decomposing stage to obtain the catalyst in the activation stage.

2. The catalyst according to claim 1, wherein the catalyst comprises
   from 3% to 10% in weight of the active phase, and
   from 5% to 15% in weight of each of the promoting agents.

3. The catalyst according to claim 1, wherein the mixed oxide of the support is magnesium and aluminum.

4. The catalyst according to claim 1, wherein the catalyst comprises
   nickel, in a proportion from 3% to 10% in weight,
   cobalt, in a proportion from 5% to 15% in weight, and
   cerium oxide, in a proportion from 5% to 15% in weight.

5. The catalyst according to claim 1, wherein the catalyst comprises
   nickel, in a proportion from 5% to 7% in weight,
   cobalt, in a proportion from 6% to 9% in weight, and
   cerium oxide, in a proportion from 7% to 10% in weight.

6. The catalyst according to claim 1, wherein the content of rhenium is 0.1% to 2% in weight.

7. The catalyst according to claim 1, wherein it has an X-ray pattern which contains the peaks (degrees) and relative intensities ($I/I0$):

| 2Θ (degrees) ± 0.5 | Relative Intensity ($I/I_0$) |
|---|---|
| 37.74 | M |
| 43.70 | F |
| 44.58 | MF |
| 51.84 | M |
| 62.78 | M | where
$I_0$ is the intensity of the strongest peak to which a value of 100 has been assigned;
d is a weak relative intensity of 0 to 20%;
m is a medium relative intensity of 20% to 40%;
f is a strong relative intensity of 40% to 60%;
mf is a very strong relative intensity of 60% to 100%.

8. The catalyst according to claim 1, wherein the catalyst has an X-ray pattern which contains at least two peaks (degrees) and relative intensities ($I/I_0$):

| 2Θ (degrees) ± 0.5 | Relative Intensity ($I/I_0$) |
|---|---|
| 37.74 | M |
| 43.70 | M |
| 44.58 | MF |
| 51.84 | D |
| 62.78 | M | wherein
$I_0$ is an intensity of the strongest peak to which a value of 100 has been assigned;
d is a weak relative intensity of 0 to 20%;
m is a medium relative intensity of 20% to 40%;
f is a strong relative intensity of 40% to 60%; and
mf is a very strong relative intensity of 60% to 100%.

9. The process according to claim 1, wherein:
the synthesis stage further comprises:
preparing two solutions, a first solution containing a metal of interest and a second solution containing a precipitating base to the metal of interest,
co-adding the first and second solutions to obtain a gel,
aging the gel to crystallize a hydrotalcite phase,
washing the gel with the hydrotalcite phase to obtain a neutral pH, and
drying the gel with the hydrotalcite phase of a neutral pH,
wherein the thermal decomposing stage comprises the calcination process in an air atmosphere at a temperature of from 723K to 1273K, and
wherein the activation stage comprises reducing in a hydrogen atmosphere up to a temperature from 873K to 1173K.

* * * * *